(12) United States Patent
Yachida

(10) Patent No.: US 11,727,579 B2
(45) Date of Patent: Aug. 15, 2023

(54) INFORMATION PROCESSING APPARATUS, CONTROL METHOD, AND PROGRAM

(71) Applicant: NEC CORPORATION, Tokyo (JP)

(72) Inventor: Shoji Yachida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 534 days.

(21) Appl. No.: 16/758,671

(22) PCT Filed: Nov. 6, 2018

(86) PCT No.: PCT/JP2018/041101
§ 371 (c)(1),
(2) Date: Apr. 23, 2020

(87) PCT Pub. No.: WO2019/093297
PCT Pub. Date: May 16, 2019

(65) Prior Publication Data
US 2020/0349719 A1   Nov. 5, 2020

(30) Foreign Application Priority Data

Nov. 13, 2017 (JP) .................... 2017-218281

(51) Int. Cl.
*G06T 7/00* (2017.01)
*G06T 7/246* (2017.01)
(Continued)

(52) U.S. Cl.
CPC ............. *G06T 7/248* (2017.01); *G01S 13/89* (2013.01); *G01S 15/89* (2013.01); *G06T 7/70* (2017.01); *H04N 23/695* (2023.01)

(58) Field of Classification Search
CPC ..... G03F 7/70641; G06T 7/292; G06T 7/248; H04N 9/3147; H04L 67/06; H04L 67/1095; H04L 67/104; H04L 67/1097
(Continued)

(56) References Cited

U.S. PATENT DOCUMENTS

2006/0177103 A1* 8/2006 Hildreth ................ G06F 1/1686
                                                                  348/208.99
2016/0267350 A1   9/2016 Oki
(Continued)

FOREIGN PATENT DOCUMENTS

JP   2004-320175 A   11/2004
JP   2007-116666 A    5/2007
(Continued)

OTHER PUBLICATIONS

Japanese Office Action for JP Application No. 2021-032372 dated Feb. 8, 2022 with English Translation.
(Continued)

*Primary Examiner* — Phuoc H Doan
(74) *Attorney, Agent, or Firm* — Sughrue Mion, PLLC

(57) ABSTRACT

An information processing apparatus determines a direction (first direction (12)) from a sensor (10) toward a moving object (20) by detecting the moving object (20) using the sensor (10). The information processing apparatus causes a camera (30) to perform imaging while moving the optical axis direction (34) of the camera (30) along the first direction (12). As a result, a plurality of captured images (32), each of which is captured in the different direction, are generated by the camera (30). The information processing apparatus (2000) detects the moving object (20) by performing image analysis on the captured image (32).

9 Claims, 12 Drawing Sheets

(51) Int. Cl.
*G06T 7/70* (2017.01)
*G01S 13/89* (2006.01)
*G01S 15/89* (2006.01)
*H04N 23/695* (2023.01)

(58) Field of Classification Search
USPC .................................. 382/100, 103, 107
See application file for complete search history.

(56) References Cited

U.S. PATENT DOCUMENTS

2017/0163881 A1  6/2017  Oshima et al.
2017/0280108 A1  9/2017  Matsumoto et al.

FOREIGN PATENT DOCUMENTS

| | | |
|---|---|---|
| JP | 2010-124023 A | 6/2010 |
| JP | 2016-170522 A | 9/2016 |
| JP | 2017-050829 A | 3/2017 |
| JP | 2017-175475 A | 9/2017 |
| JP | 2017-192104 | 10/2017 |
| WO | 2016/038971 A1 | 3/2016 |

OTHER PUBLICATIONS

International Search Report for PCT/JP2018/041101, dated Jan. 29, 2019.

\* cited by examiner

INFORMATION PROCESSING APPARATUS, CONTROL METHOD, AND PROGRAM

CROSS REFERENCE TO RELATED APPLICATIONS

This application is a National Stage of International Application No. PCT/JP2018/041101 filed Nov. 6, 2018, claiming priority based on Japanese Patent Application No. 2017-218281 filed Nov. 13, 2017, the contents of all of which are incorporated herein by reference.

TECHNICAL FIELD

The present invention relates to an information processing apparatus, a control method, and a program.

BACKGROUND ART

Cameras are used for monitoring a moving object. For example, Patent Literature 1 discloses a surveillance camera device that monitors a moving object using a wide-angle camera and a telephoto camera disposed side by side. This surveillance camera device detects the moving object using an image generated by the wide-angle camera, and changes the direction of an imaging optical axis of the telephoto camera based on a position of the moving object in the image. In this way, the moving object is imaged at the center of an imaging range of the telephoto camera.

RELATED DOCUMENT

Patent Document

[Patent Document 1] Japanese Patent Application Publication No. 2007-116666

SUMMARY OF THE INVENTION

Technical Problem

In the surveillance camera device of Patent Document 1, it is based on the premise that the telephoto camera is placed in the vicinity of the wide-angle camera, that is, that the telephoto camera and the wide-angle camera can capture images in substantially the same direction. Awing to this premise, the imaging optical axis of the telephoto camera can be directed to the direction substantially the same as the direction to the moving object from the wide-angle camera, and thus, the moving object can be imaged by the telephoto camera. Therefore, in the technology in Patent Document 1, the telephoto camera and the wide-angle camera cannot be provided at the positions separated from each other.

The present invention has been made in view of this problem, and one of objects of the present invention is to provide a technology capable of disposing a sensor used for detecting a moving object at a flexible position.

Solution to Problem

An information processing apparatus according to the present invention includes: 1) a first detection unit that detects a moving object using a sensor and determines a first direction from the sensor toward the moving object, 2) a control unit that causes a first camera to perform imaging while moving the optical axis direction of the first camera along the first direction, and 3) a second detection unit that detects the moving object from a first captured image generated by the first camera.

A control method in the present invention is executed by a computer. The control method includes: 1) detecting for detecting a moving object using a sensor and determining a first direction from the sensor toward the moving object, 2) causing a first camera to perform imaging while moving the optical axis direction of the first camera along the first direction, and 3) detecting for detecting the moving object from a first captured image generated by the first camera.

A program in the present invention causes the computer to execute each step included in the control method in the invention.

Advantageous Effects of Invention

According to the present invention, the technology capable of disposing the sensor used for detecting the moving object in a flexible position is provided.

BRIEF DESCRIPTION OF THE DRAWINGS

The above-described object and other objects, features, and advantages will be further clarified by the preferred example embodiments described below and the following drawings attached thereto.

DESCRIPTION OF EMBIDIMENTS

Figure 1:
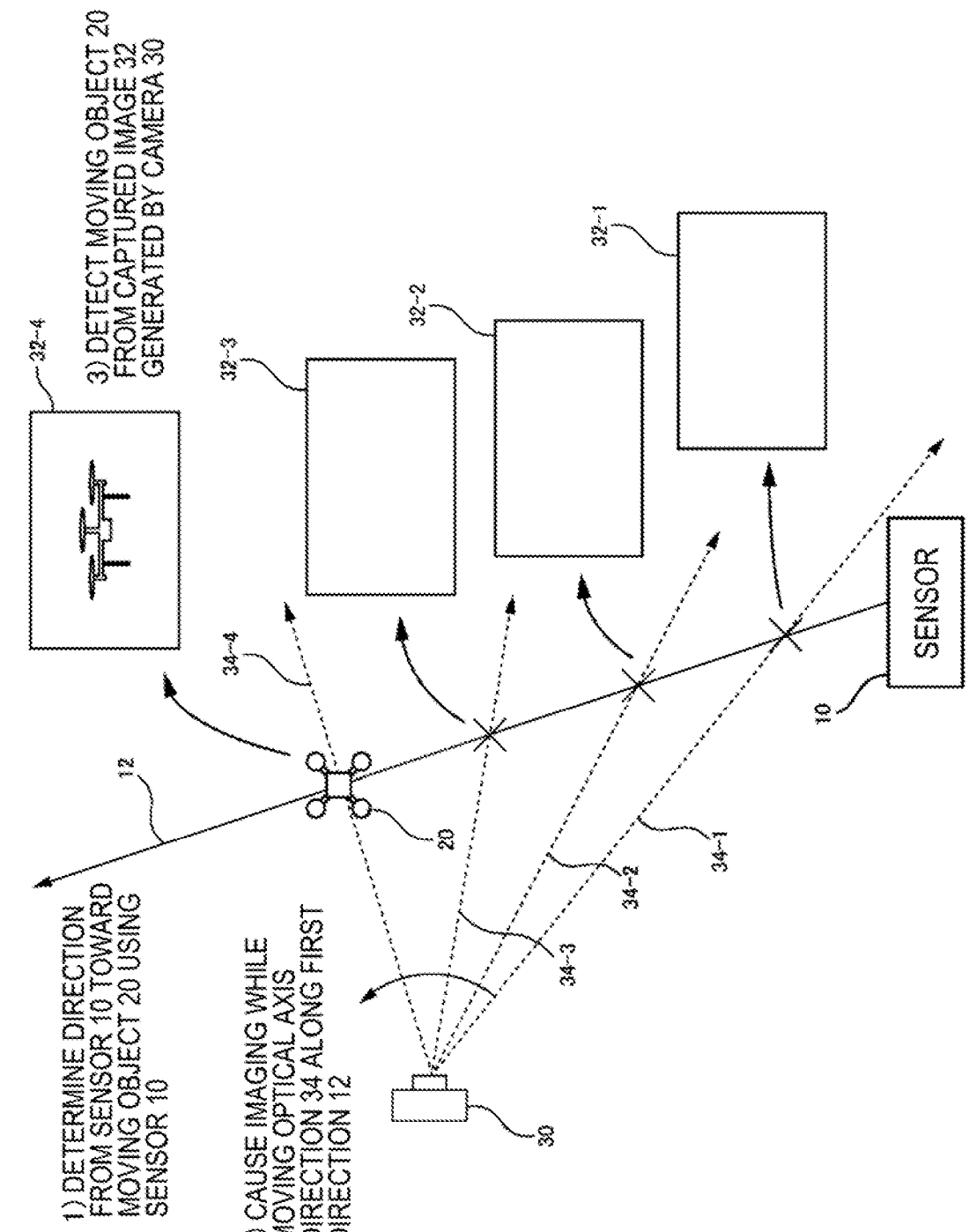
FIG. 1 is a diagram for describing an overview of an information processing apparatus according to an example embodiment 1.

Hereinafter, example embodiments of the present invention will be described with reference to the drawings. Note that, in all the drawings, the same reference numerals are given to the same configuration elements, and the description thereof will not be repeated as appropriate. Further, unless otherwise described, each block in each block diagram represents a functional unit configuration, not a hardware unit configuration.

Example Embodiment 1

Overview

FIG. 1 is a diagram for describing an overview of an information processing apparatus (an information processing apparatus 2000 illustrated in FIG. 2) according to an example embodiment 1. An operation of the information processing apparatus 2000 described below is an example for facilitating the understanding of the information processing apparatus 2000, and the operation of the information processing apparatus 2000 is not limited to the following example. Details and variations of the operation of the information processing apparatus 2000 will be described later.

The information processing apparatus 2000 determines a direction (a first direction 12 in FIG. 1) from a sensor 10 to a moving object 20 by detecting the moving object 20 using the sensor 10. The information processing apparatus 2000 causes a camera 30 to capture an image while moving an optical axis direction 34 of the camera 30 along a first direction 12 (that is, from the sensor 10 toward the moving object 20). As a result, a plurality of captured images 32 each captured in different directions are generated by the camera 30. The information processing apparatus 2000 detects the moving object 20 by performing the image analysis on the captured image 32.

According to this method, the camera 30 can detect the moving object 20 even though the sensor 10 and the camera 30 are not installed in the vicinity of each other. It is because the moving object 20 can be included in any one of the captured images 32 by repeating the imaging by the camera 30 while moving the optical axis direction 34 of the camera 30 along the first direction 12 since the moving object 20 exists in the first direction 12. Therefore, the information processing apparatus 2000 in the present example embodiment has an advantage that the sensor 10 and the moving object 20 do not need to be installed in the vicinity of each other, and can be disposed at more free positions.

Hereinafter, the information processing apparatus 2000 in the present example embodiment will be described in more details.

Example of Functional Configuration of Information Processing Apparatus 2000

Figure 2:
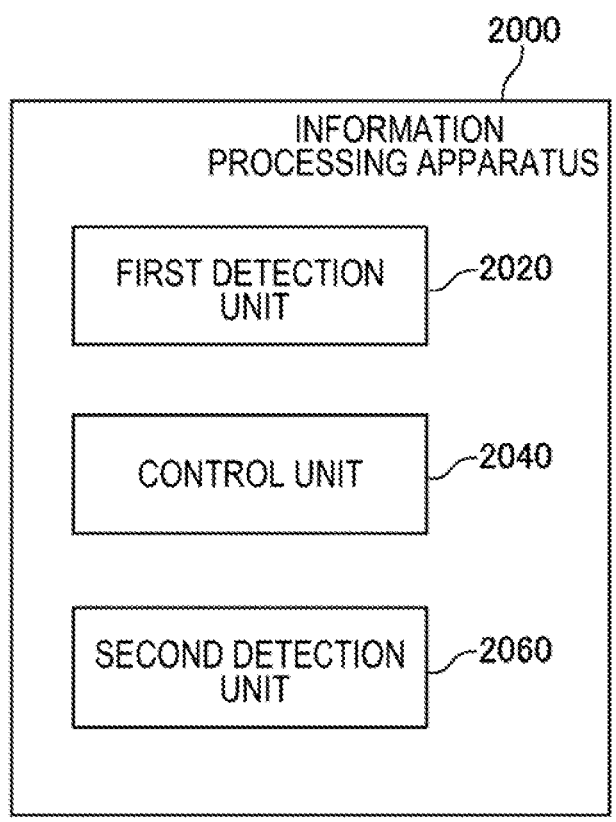
FIG. 2 is a diagram illustrating a functional configuration of the information processing apparatus according to the example embodiment 1.

FIG. 2 is a diagram illustrating a functional configuration of the information processing apparatus 2000 according to the example embodiment 1. The information processing apparatus 2000 includes a first detection unit 2020, a control unit 2040, and a second detection unit 2060. The first detection unit 2020 detects the moving object 20 using the sensor 10 and determines a first direction 12 from the sensor 10 toward the moving object 20. The control unit 2040 causes the camera 30 to capture an image while moving the optical axis direction 34 of the camera 30 along the first direction 12. The second detection unit 2060 detects the moving object 20 from the captured image 32 generated by the camera 30.

Hardware Configuration of Information Processing Apparatus 2000

Each functional configuration unit of the information processing apparatus 2000 may be realized by hardware (for example, a hard-wired electronic circuit) that realizes each functional configuration unit, or may be realized by a combination of hardware and software (for example, a combination of an electronic circuit and a program for controlling the electronic circuit). Hereinafter, the case where each functional configuration unit of the information processing apparatus 2000 is realized by a combination of hardware and software will be further described.

Figure 3:
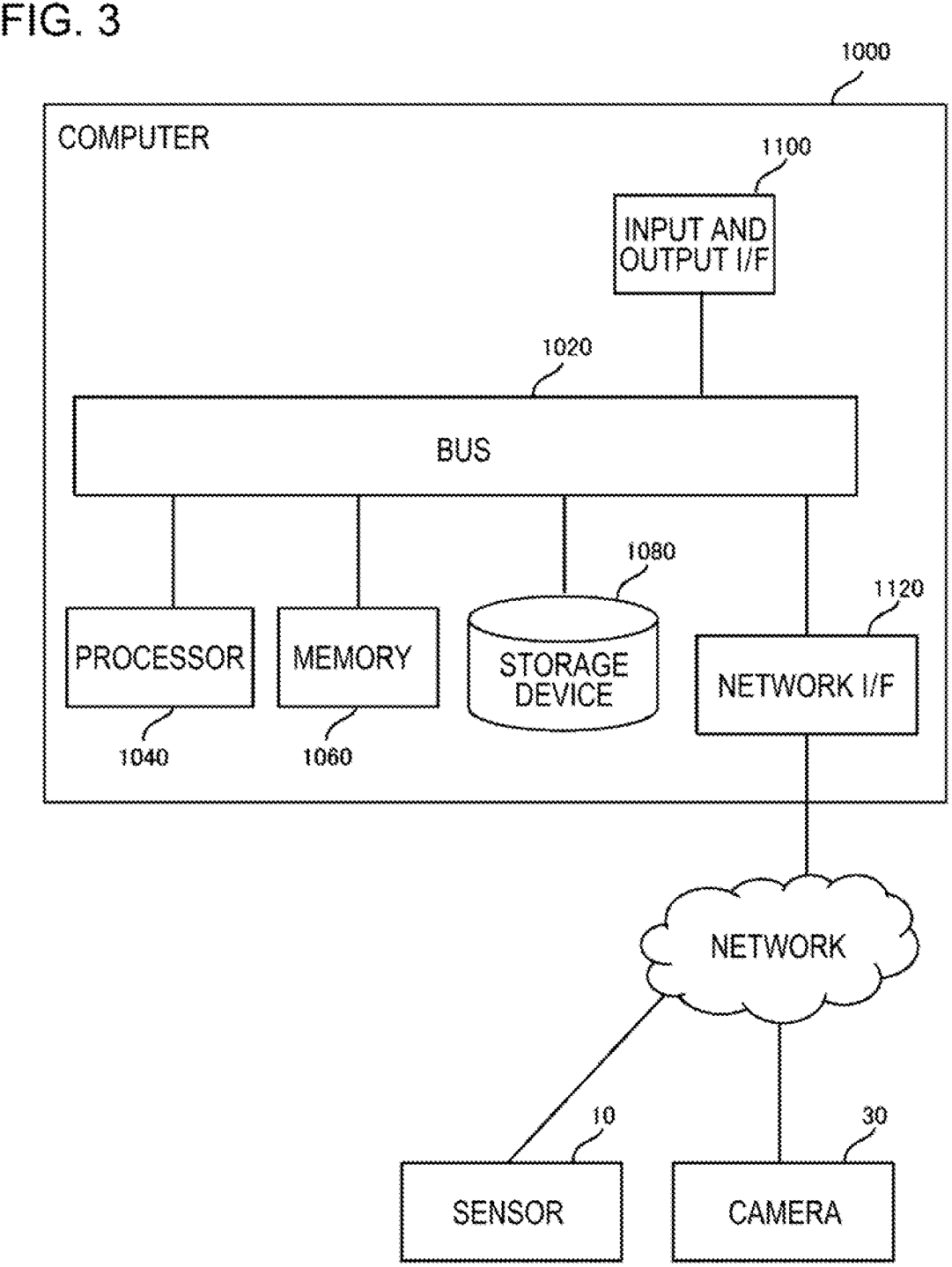
FIG. 3 is a diagram illustrating a computer for realizing the information processing apparatus.

FIG. 3 is a diagram illustrating a computer 1000 for realizing the information processing apparatus 2000. The computer 1000 is any computer. For example, the computer 1000 is a personal computer (PC), a server machine, a tablet terminal, or a smartphone. The computer 1000 may be a dedicated computer designed for realizing the information processing apparatus 2000 or may be a general-purpose computer.

The computer 1000 includes a bus 1020, a processor 1040, a memory 1060, a storage device 1080, an input and output interface 1100, and a network interface 1120. The bus 1020 is a data transmission path through which the processor 1040, the memory 1060, the storage device 1080, the input and output interface 1100, and the network interface 1120 transmit and receive data to and from each other. However, the method for connecting the processors 1040 and the like is not limited to the bus connection. The processor 1040 is various processors such as a central processing unit (CPU), a graphics processing unit (GPU), or a field-programmable gate array (FPGA). The memory 1060 is a main storage device realized using a RAM (Random Access Memory) or the like. The storage device 1080 is an auxiliary storage device realized using a hard disk, a solid state drive (SSD), a memory card, a read only memory (ROM), or the like.

The input and output interface 1100 is an interface for connecting the computer 1000 and an input output device. For example, an input device such as a keyboard and an output device such as a display device are connected to the input and output interface 1100.

The network interface 1120 is an interface for connecting the computer 1000 to a network. This network is, for example, a local area network LAN) or a wide area network (WAN). The method for connecting the network interface 1120 to the network may be a wireless connection or may be a wired connection.

For example, the sensor 10 and the camera 30 are connected to the network interface 1120 via the network. The sensor 10 is any sensor that can detect the moving object 20. For example, a camera, an acoustic sensor, a radio wave sensor, or the like can be used as the sensor 10, which will be described later in detail. The camera 30 is any imaging device that performs imaging and generates a captured image. For example, the camera 30 is a video camera that generates video data by performing imaging periodically. In this case, the captured image 32 is each frame that configures the video data.

The storage device 1080 stores a program module that realizes each functional configuration unit of the information processing apparatus 2000. The processor 1040 realizes a function corresponding to each program module by reading each program module into the memory 1060 and executing the program module.

Flow of Processing

Figure 4:
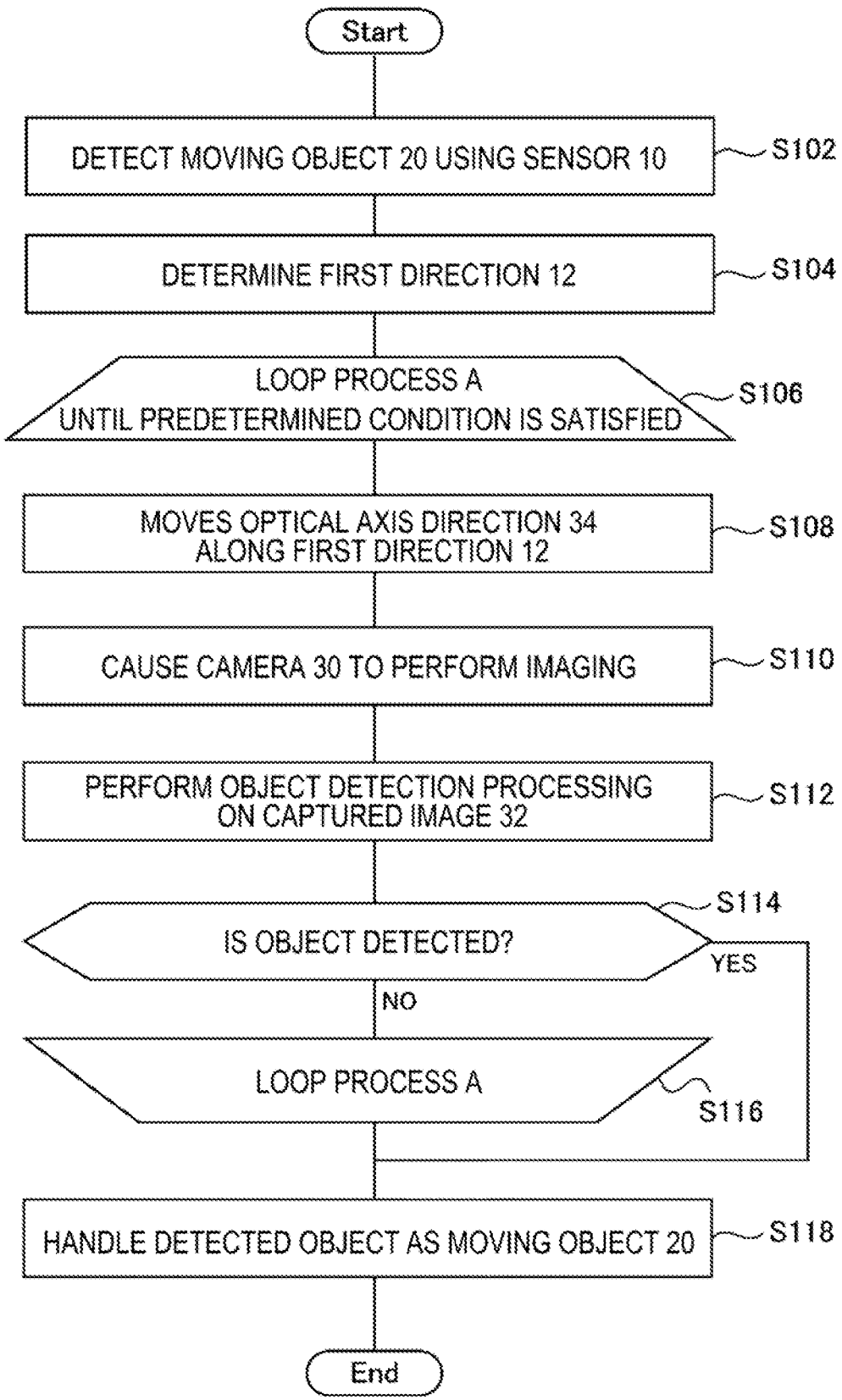
FIG. 4 is a flowchart illustrating a flow of processing performed by the information processing apparatus according to the example embodiment 1.

FIG. 4 is a flowchart illustrating a flow of processing performed by the information processing apparatus 2000 according to the example embodiment 1. The first detection unit 2020 detects the moving object 20 using the sensor 10

(S102). The first detection unit 2020 determines the first direction 12 from the sensor 10 toward the moving object 20 (S104).

S106 to S116 are loop processes that are repeatedly performed until a predetermined condition is satisfied. If the predetermined condition is satisfied, the processing in FIG. 4 ends. On the other hand, if the predetermined condition is not satisfied, the process in FIG. 4 proceeds to S108.

The control unit 2040 moves the optical axis direction 34 of the camera 30 along the first direction 12 (S108). The control unit 2040 causes the camera 30 to perform imaging (S110). The second detection unit 2060 performs object detection processing on the captured image 32 generated by the camera 30 (S112). When an object is detected from the captured image 32 (S114: YES), the second detection unit 2060 detects the detected object as the moving object 20 (S118). Then, the processing in FIG. 4 ends. On the other hand, when an object is not detected from the captured image 32 (S114: NO), the processing in FIG. 4 proceeds to S106.

There are various predetermined conditions for ending the loop process A. For example, the predetermined condition is a condition that the camera 30 has finished imaging the entire imageable range along the first direction 12. More specifically, the predetermined condition is a condition that the imaging direction of the camera 30 becomes parallel to the first direction 12.

Note that, the flow of processing performed by the information processing apparatus 2000 is not limited to the flow illustrated in FIG. 4. For example, the control unit 2040 may perform the object detection processing on each of the generated captured images after causing the camera 30 to perform the imaging multiple times. That is, the object detection processing for each of the plurality of captured images generated by the camera 30 may be collectively performed after the loop process A.

In addition, the control unit 2040 may not unconditionally handle the object detected in S112 as the moving object 20, but handle the object as the moving object 20 if the object satisfies a predetermined condition. This point will be described later.

Detection of Moving Object 20 Using Sensor 10

The first detection unit 2020 detects the moving object 20 using the sensor 10. The method of detecting the moving object 20 using the sensor 10 depends on the type of the sensor used. Hereinafter, methods of detecting the moving object 20 will be exemplified for each of the main types of sensors that can be used as the sensor 10.

Case of Using Camera

Figure 5:
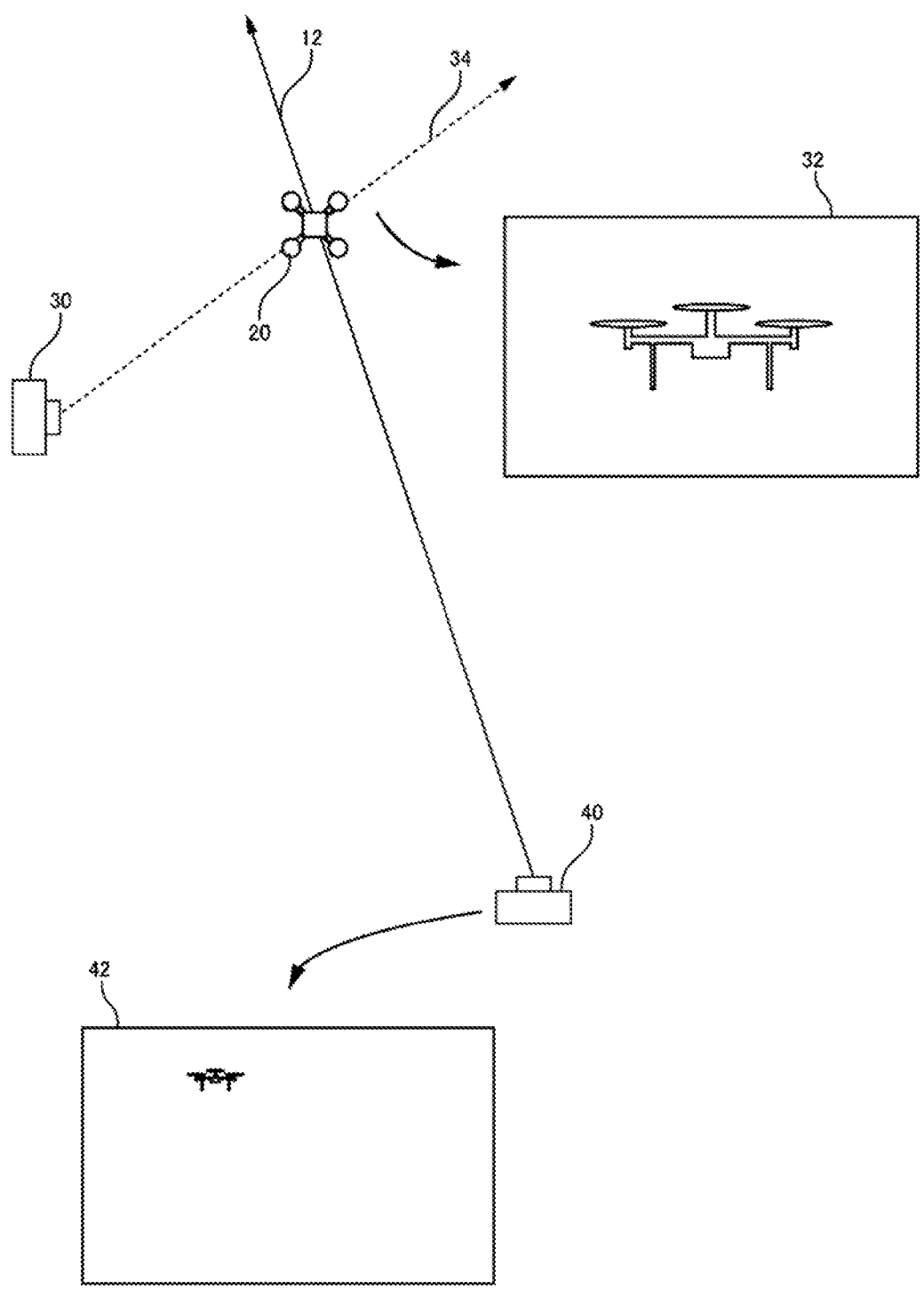
FIG. 5 is a diagram illustrating a case where a second camera is used as a sensor.

For example, a camera can be used as the sensor 10. Here, the camera used as the sensor 10 will be called as a second camera. FIG. 5 is a diagram illustrating a case where the second camera is used as the sensor 10. In FIG. 5, the second camera is represented by a reference numeral 40. Hereinafter, a captured image generated by the second camera 40 is referred to as a second captured image 42.

The imaging by the second camera 40 is performed with its angle of view being wider than that of the camera 30. In other words, the imaging by the second camera 40 is performed with its focal length being shorter than that of the camera 30. Therefore, for example, a telephoto camera is used as the camera 30, and a wide-angle camera is used as the second camera 40. By using such two cameras, first, the existence of the moving object 20 and the direction in which the moving object 20 exists are recognized early by imaging a wide range using the wide-angle camera (camera 30), and then, an operation of recognizing the details of the moving object 20 can be performed by taking a larger image of the moving object 20 using the telephoto camera (second camera 40).

The first detection unit 2020 detects the moving object 20 from the second captured image 42 generated by the second camera 40. Here, the first detection unit 2020 may detect any object included in the second captured image 42 as the moving object 20 (refer to FIG. 3), or may detect the object that is included in the second captured image 42 and satisfies a predetermined condition as the moving object 20. In the former case, the first detection unit 2020 extracts, for example, a foreground area from the second captured image 42, and handles an object appeared in the foreground area as the moving object 20. Here, an existing technology can be used as a technology for extracting the foreground area from the image.

On the other hand, it is assumed that an object that satisfies a predetermined condition is detected as the moving object 20. In this case, for example, a feature value of the object to be detected as the moving object 20 is set in advance. The first detection unit 2020 detects an image area having this feature value from the second captured image 42, and handles an object appeared in the detected image area as the moving object 20. The object to be detected as the moving object 20 is, for example, a flying object such as an airplane, a drone, or a bird. Note that, existing technologies can be used as the technology for setting the feature value of an object to be detected and the technology for detecting the object having the feature value from the image.

Alternatively, for example, the first detection unit 2020 may detect only a moving object among the objects detected from the second captured image 42 as the moving object 20. For example, when the control unit 2040 detects an object from a certain second captured image 42, the control unit 2040 judges whether the object is moving or not by tracking the objects in each of the second captured images 42 generated thereafter. If it is judged that the object is moving, the control unit 2040 handles that object as the moving object 20. On the other hand, if it is judged that the object is not moving, the control unit 2040 does not handle that object as the moving object 20. Note that, an existing technology can be used as a technology for judging whether the object detected from an image is moving or not.

The first detection unit 2020 may handle the entire image area of the second captured image 42 as the detection target of the moving object 20 or may handle only a part of the image area in the second captured image 42 as the detection target of the moving object 20. In the latter case, the image area to be a detection target of the moving object 20 is called as a detection area.

Figure 6:
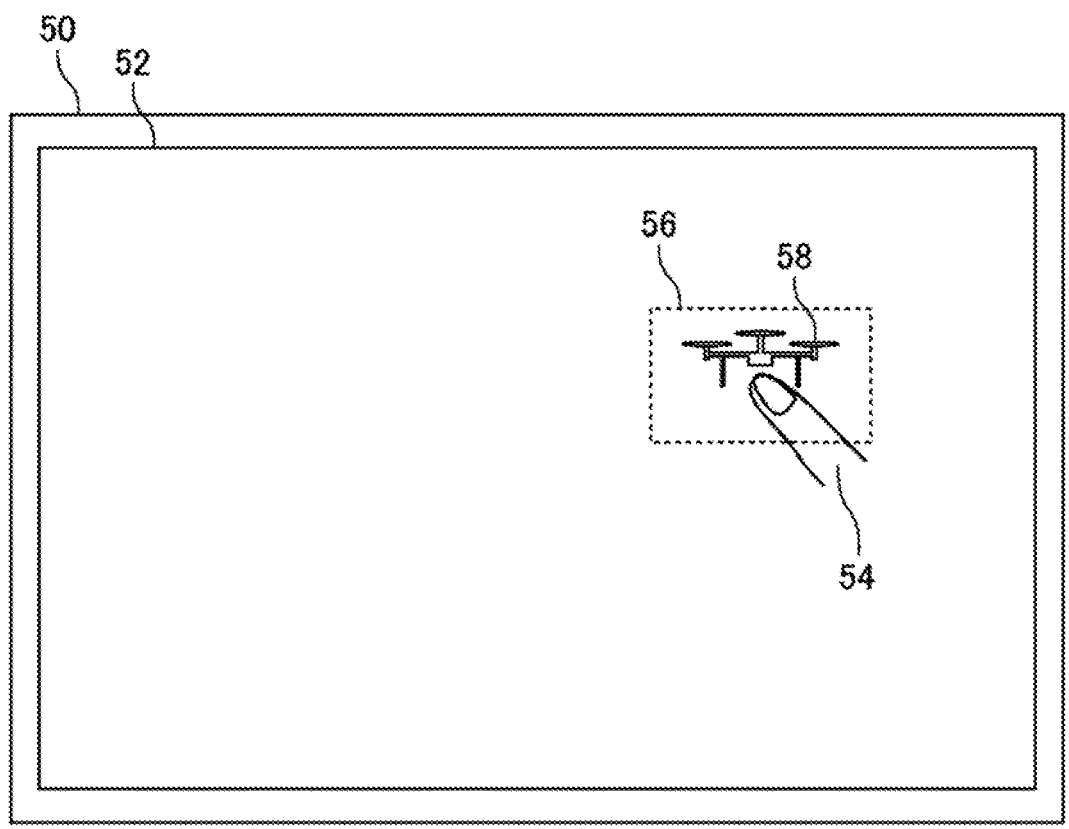
FIG. 6 is a diagram illustrating a case where the specification of the detection area is received from the user.

For example, the information processing apparatus 2000 receives an input operation for specifying the detection area from a user. FIG. 6 is a diagram illustrating a case where the specification of the detection area is received from the user. In FIG. 6, a video 52 configured in the second captured image 42 captured by the second camera 40 is displayed on a touch panel 50. By seeing the video 52, the user finds the object that is desired to be detected by the information processing apparatus 2000 as the moving object 20. When finding the object that is desired to be detected as the moving object 20, the user touches a position on the touch panel 50 where the object is displayed. The first detection unit 2020 determines an image position corresponding to the touched position in the second captured image 42, and detects the object in the image area of the second captured image 42 based on the image position. Then, the first detection unit 2020 handles the detected object as the moving object 20. For example, in FIG. 6, a rectangular area 56 having a center on the image position touched by the user with a finger 54 is handled as the detection area. As a result, a drone 58 is detected as the moving object 20.

There are various methods for the user to specify the detection area. For example, the user specifies a position in the second captured image 42 as described above. The first detection unit 2020 handles the image area having a predetermined size and shape set based on the specified position, as the detection area. Note that, an existing technology can be used as a technology for setting the image area having a predetermined size and shape based on the specified position.

The user may specify an area instead of the position in the second captured image 42. In this case, the area specified by the user is handles as the detection area. For example, a drag operation, a slide operation, or the like can be used as an operation for specifying the area.

Case Where Acoustic Sensor is Used

For example, an acoustic sensor can be used as the sensor 10. As the acoustic sensor, a microphone array in which a plurality of microphones are three-dimensionally arranged is used. Here, a fact that a plurality of microphones are arranged three-dimensionally means that there is no single plane passing through all the microphones configuring the microphone array.

When the same sound is detected by a plurality of microphones arranged three-dimensionally, the direction from the microphone array toward the source of the sound can be determined. Therefore, if a sound having a predetermined feature is detected by a plurality of microphones configuring the acoustic sensor, the first detection unit 2020 detects the source of the sound as the moving object 20.

Various features can be handled as the "predetermined feature". For example, the predetermined feature is represented by the magnitude of a sound pressure. In this case, the first detection unit 2020 judges whether or not the sound pressure of the sound detected by the acoustic sensor is equal to or higher than a predetermined value, and if the sound pressure is equal to or higher than the predetermined value, the first detection unit 2020 handles the source of the sound as the moving object 20. That is, a sound source that emits a sound louder than a volume set in advance is handled as the moving object 20.

In another example, the predetermined feature is represented by a frequency spectrum of a sound emitted from the moving object 20 to be detected. In this case, the first detection unit 2020 analyzes the frequency spectrum of the sound detected by the acoustic sensor, and if the sound has a frequency spectrum that matches or is similar to a predetermined feature, the first detection unit 2020 handles the source of the sound as the moving object 20. The predetermined feature when detecting an airplane as the moving object 20 is, for example, the frequency spectrum of the engine sound of the airplane. The predetermined feature when detecting a drone as the moving object 20 is, for example, a frequency spectrum of a rotation sound of a drone rotor (hereinafter, rotor sound).

Note that, the frequency spectrum of the engine sound of an airplane differs depending on the model of the airplane. Thus, the predetermined feature may be defined as a range of a frequency spectrum that is somewhat wide so as to include the frequency spectrum of the engine sounds of various airplanes, or may be represented as a frequency spectrum of the engine sounds of an airplane of a certain specific model or the like. In the latter case, only the airplane of the specific model is detected as the moving object 20.

Similarly, the frequency spectrum of the rotor sound of a drone also differs depending on the type of drone. Thus, the predetermined feature may be defined as a frequency spectrum range of a certain wide range so as to include the frequency spectrum of the rotor sound of various drones, or may be represented as the frequency spectrum of the rotor sound of a drone of a specific model or the like. In the latter case, only the drone of the specific model is detected as the moving object 20.

Here, the feature of the sound emitted from the moving object to be detected as the moving object 20, that is, information indicating the above predetermined feature is referred to as sound feature information. The sound feature information is stored in a storage device accessible from the first detection unit 2020. The first detection unit 2020 acquires the sound feature information, and judges whether or not a sound having a predetermined feature indicated in the sound feature information is detected by the acoustic sensor. Then, when the sound having a predetermined feature is detected by the acoustic sensor, the first detection unit 2020 determines the direction from the sensor 10 toward the source of the sound as the first direction 12.

Case of Using Radio Wave Sensor

For example, a radio wave sensor can be used as the sensor 10. As the radio wave sensor, a receiver array in which a plurality of radio wave receivers are three-dimensionally arranged is used. Here, a fact that a plurality of radio wave receivers are arranged three-dimensionally means that there is no single plane passing through all the receivers configuring the receiver array. If the radio waves having predetermined feature are detected by a plurality of receivers configuring the radio wave sensor, the first detection unit 2020 handles the source of the radio waves as the moving object 20.

Various features can be handled as the predetermined feature. For example, the predetermined feature is represented by the magnitude of the amplitude of the radio wave. In this case, the first detection unit 2020 judges whether or not the magnitude of the amplitude of the radio wave detected by the radio wave sensor is equal to or greater than a predetermined value, and handles the source of the radio waves as the moving object 20 if the magnitude is equal to or greater than the predetermined value. That is, a source that emits a radio wave whose magnitude of the amplitude is greater than the predetermined size is handles as the moving object 20.

In another example, the predetermined feature is represented by a frequency spectrum of the radio wave emitted from the moving object 20 to be detected. In this case, the first detection unit 2020 analyzes the frequency spectrum of the radio wave detected by the radio wave sensor, and handles the source of the sound as the moving object 20 if the radio wave has a frequency spectrum that matches or is similar to a predetermined feature. In this case, the frequency spectrum of the radio wave output from the moving object 20 to be detected is recognized in advance, and information representing the frequency spectrum is stored in the storage device.

In another example, the predetermined feature is represented by data carried on a radio wave emitted by the moving object 20 to be detected. When the moving object 20 transmits the data on the radio wave, the content of the data can be recognized by demodulating the radio wave using the receiver and extracting the data. For example, it is assumed that the moving object 20 wirelessly transmits an Ethernet (registered trademark) frame. In this case, as the source media access control (MAC) address, the Ethernet (registered trademark) frame indicates the MAC address of the network interface of the moving object 20. Therefore, the first detection unit 2020 demodulates the radio wave received by the radio wave sensor, extracts the Ethernet (registered trademark) frame, and recognizes the source MAC address of the Ethernet (registered trademark) frame to obtain information relating to the source of the radio wave.

Therefore, for example, the first detection unit 2020 determines the emission source of the data obtained from the radio wave received by the radio wave sensor, and detects the emission source as the moving object 20 if the emission source satisfies a predetermined condition. For example, the predetermined condition is "the emission source is an object having a specific source address". In this case, the first detection unit 2020 detects only an object having the specific address as the moving object 20. In this way, it becomes possible to detect only the object having the specific address as the moving object 20.

In addition, for example, the predetermined condition is "the transmission source belongs to a predetermined group". For example, generally a vendor code is included in the MAC address. Therefore, the manufacturer of the generation source of the radio wave can be determined using the vendor code. Accordingly, it is possible to detect only the moving object 20 manufactured by a specific manufacturer.

Here, the information indicating the predetermined feature is referred to as feature information. The feature information is stored in a storage device accessible from the first detection unit 2020. The first detection unit 2020 acquires the feature information, judges whether or not the radio wave having the predetermined feature indicated in the feature information is detected by the radio wave sensor, and then, detects the moving object 20 that emits the radio wave having the predetermined feature.

Here, the feature of the radio wave emitted by the moving object to be detected as the moving object 20, that is, the information indicating the above-described predetermined feature is referred to as radio wave feature information. The radio wave feature information is stored in the storage device accessible from the first detection unit 2020. The first detection unit 2020 acquires the radio wave feature information, and judges whether or not the radio wave having the predetermined feature indicated in the radio wave feature information is detected by the radio wave sensor. Then, if the radio wave having the predetermined feature is detected by the radio wave sensor, the first detection unit 2020 determines the direction from the sensor 10 toward the source of the radio wave as the first direction 12.

Determination of First Direction 12

The first detection unit 2020 determines the first direction 12 using the sensor 10. The first direction 12 is a direction from the sensor 10 toward the moving object 20. For example, when the second camera 40 is used as the sensor 10, the first detection unit 2020 determines the first direction 12 based on various setting parameters (such as an imaging direction and a focal length) of the camera 30 and the position of the moving object 20 in the second captured image 42. Here, an existing technology can be used as the technology for determining the direction from the camera toward the object based on the setting parameters of the camera and the position of the object in the captured image.

When the above-described acoustic sensor is used as the sensor 10, for example, the control unit 2040 determines the direction from the acoustic sensor toward the moving object 20 based on a difference of timing at which each microphone detects the sound emitted from the moving object 20. Here, an existing technique can be used as a technique for determining a direction toward a sound source of a sound based on a difference in timing when a certain sound is detected by each of the three-dimensionally arranged microphones. Note that, when the above-described radio wave sensor is used as the sensor 10, the first direction 12 can be determined by the same method as when the acoustic sensor is used.

Control of Camera 30: S106 and S108

The control unit 2040 causes the camera 30 to perform imaging a plurality of times while moving the optical axis direction 34 of the camera 30 along the first direction 12 (S106 and S108). Here, the control unit 2040 may change the optical axis direction 34 of the camera 30 by changing a pose of the camera 30, or may change the optical axis direction 34 of the camera 30 without changing the pose of the camera 30. In the former case, for example, the control unit 2040 moves the optical axis direction 34 of the camera 30 by changing the pose of a table such as a camera platform on which the camera 30 is installed. On the other hand, in the latter case, for example, an optical element (a mirror or the like) is disposed on the optical axis of the camera 30, and the control unit 2040 changes the pose of the optical element to move the optical axis direction 34 of the camera 30.

Note that, the initial position of the position on the first direction 12 through which the optical axis direction 34 of the camera 30 passes may be statically decided or may be dynamically decided. In the former case, for example, the starting point in the first direction 12 is set as the initial position.

Figure 7:
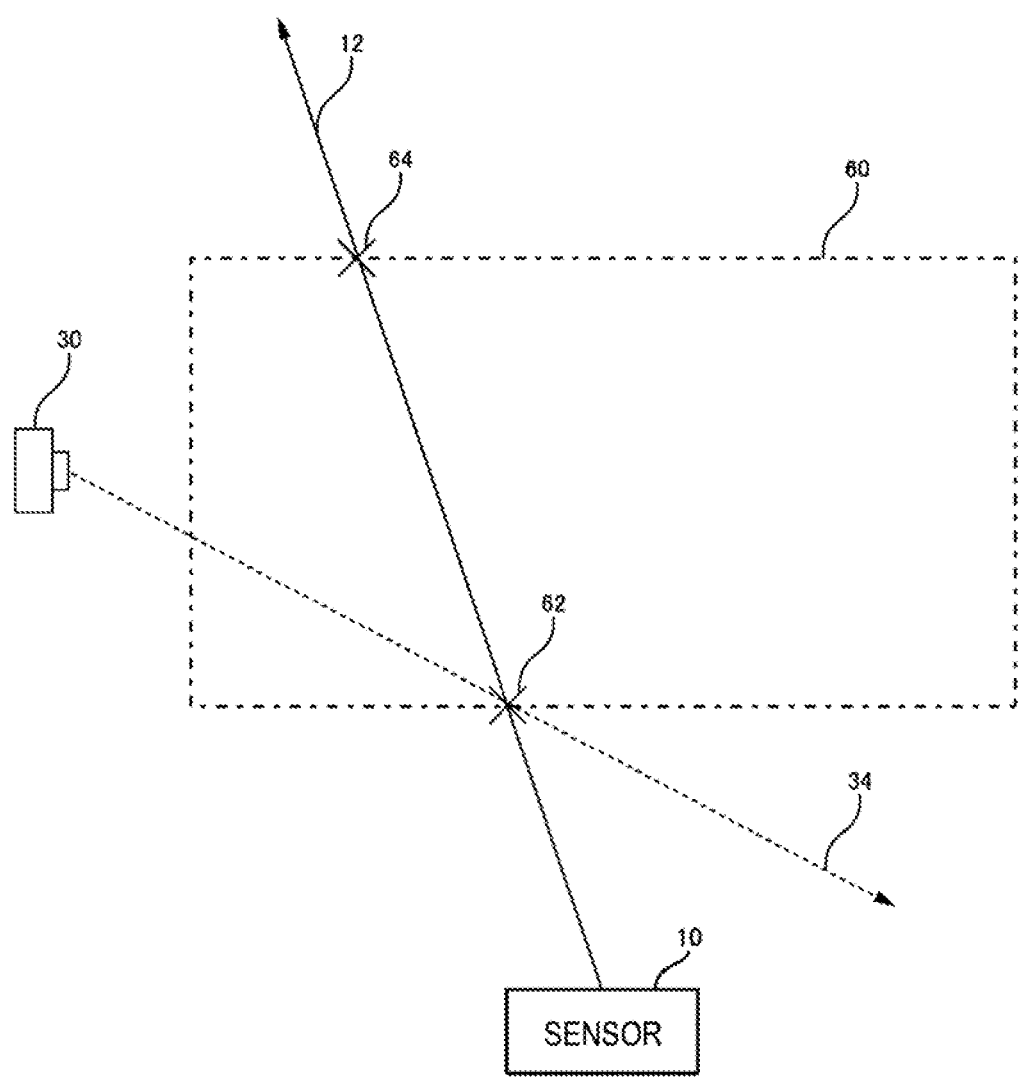
FIG. 7 is a diagram illustrating a detection space.

On the other hand, in the latter case, for example, a space range (hereinafter, a detection space) in which the moving object 20 is supposed to be detected using the information processing apparatus 2000 is set in advance, and a position where the first direction 12 enters the detection space is set as the initial position. FIG. 7 is a diagram illustrating the detection space. In FIG. 7, the detection space is indicated by a reference numeral 60. The position where the first direction 12 enters the detection space 60 is a position 62. Therefore, the control unit 2040 sets the initial position of the position on the first direction 12 through which the optical axis direction 34 of the camera 30 passes as the position 62. Note that, the position on the first direction 12 where the first direction 12 exits from the detection space 60 is the position 64. Therefore, the control unit 2040 may move the optical axis direction 34 of the camera 30 from the position 62 to the position 64.

Alternatively, for example, the control unit 2040 may decide the initial position based on a result of detection by the sensor 10. For example, it is assumed that the sensor 10 is a camera. In this case, the control unit 2040 determines the type of the moving object 20 included in the captured image 32, thereby acquiring information indicating the size of the moving object 20 in the real space. The control unit 2040 estimates a distance from the sensor 10 to the moving object 20 based on the size of the moving object 20 in the real space and the size of the moving object 20 in the captured image 32. Then, the control unit 2040 sets a position away from the sensor 10 as much as the distance estimated above along the first direction 12, as the initial position on the first direction 12 through which the optical axis direction 34 of the camera 30 passes. Note that, an existing technology can be used as the technology for estimating the distance from the camera to the object based on the size of the object in the real space and the size in the captured image.

Here, there are various methods for causing the camera 30 to perform imaging a plurality of times. For example, a video camera that periodically performs imaging at a predetermined cycle (for example, 30 frames per second (fps)) is used as the camera 30. The camera 30 may start imaging in accordance with control by the control unit 2040, or may always perform imaging. In the latter case, among the captured images 32 generated by the camera 30, the second detection unit 2060 uses the captured image 32 generated after a time point when the control unit 2040 starts to control the imaging direction of the camera 30.

Alternatively, for example, the control unit 2040 may transmit a control signal instructing imaging at each timing when the camera 30 is caused to perform imaging. In this case, the camera 30 performs imaging at the timing of receiving the control signal.

Regarding Focal Point of Camera 30

The control unit 2040 may set the focal length of the camera 30 such that the focal point of the camera 30 is positioned in the first direction 12. Specifically, the control unit 2040 computes a distance from the camera 30 to an intersection of the imaging direction of the camera 30 and the first direction 12, and sets the distance as the focal length of camera 30. Note that, the control unit 2040 changes the focal length of the camera 30 while moving the optical axis direction of the camera 30.

By setting the focal point of the camera 30 on the first direction 12 as described above, the camera 30 can image the moving object 20 in a focused state. Therefore, the second detection unit 2060 can easily detect the moving object 20 from the captured image 32.

In addition, even if an object different from the moving object 20 exists in the optical axis direction of the camera 30, the object is imaged in a state out of focus. Therefore, among the objects included in the captured image 32, it is possible to prevent erroneous detection of the moving object 20 by detecting only the in-focus object as the moving object 20. That is, it is possible to prevent the second detection unit 2060 from erroneously detecting, as the moving object 20, objects other than the object detected as the moving object 20 by the sensor 10. An existing technology can be used as the technology for judging whether or not the object in the image is in focus.

Detection of Moving Object 20 from Captured Image 32: S112, S114 and S116

The second detection unit 2060 detects the moving object 20 from the captured image 32 by detecting an object from the captured image 32 (S112, S114, S116). For example, the second detection unit 2060 performs the image analysis on the plurality of captured images 32 in an order of the earliest generation time point, and handles the first detected object as the captured image 32. In this way, if there are a plurality of objects on the first direction 12, the object closest to the sensor 10 is detected as the moving object 20.

However, the second detection unit 2060 may determine whether or not the object detected from the captured image 32 is the same as the moving object 20 detected by the first detection unit 2020 using the result of detection by the first detection unit 2020. For example, when the sensor 10 is the second camera 40, the first detection unit 2020 computes the feature value of the moving object 20 detected from the second captured image 42. From this feature value, it is possible to recognize a rough feature of the moving object 20 such as whether the moving object 20 is a bird, an airplane, or a drone.

Therefore, the second detection unit 2060 judges whether or not the object detected from the captured image 32 has the feature value of the moving object 20 computed by the first detection unit 2020. If the object detected from the captured image 32 has this feature value, the second detection unit 2060 detects the object as the moving object 20. On the other hand, if the object detected from the captured image 32 does not have this feature value, the second detection unit 2060 judges that the object is not the moving object 20.

In addition, as described above, in some cases, the type of the moving object 20 detected by the sensor 10 is set in advance. For example, when the sensor 10 is an acoustic sensor, if a sound of the rotor of a certain type of drone is detected, the moving object 20 detected by the sensor 10 is the specific model of drone. Therefore, the second detection unit 2060 may limit the object to be detected from the captured image 32 to the drone of that specific model. In this case, for example, the feature value common to the objects classified into the type to be detected using the sensor 10 is set in advance. If the object detected from the captured image 32 has this feature value, the second detection unit 2060 detects the object as the moving object 20. On the other hand, if the object detected from the captured image 32 does not have this feature value, the second detection unit 2060 judges that the object is not the moving object 20.

In addition, for example, if the focal point of the camera 30 is controlled such that the focal point of the camera 30 is positioned on the first direction 12 as described above, the second detection unit 2060 only detects the object in focus as the moving object 20 among the objects detected from the captured image 32. Here, an existing technology can be used as the technology for judging whether or not an object included in the image is in focus.

Update of First Direction 12

Here, even while the optical axis direction 34 of the camera 30 is being moved along the first direction 12, the moving object 20 can be detected using the sensor 10. Then, when the position of the moving object 20 detected by the sensor 10 is changed, the first direction 12 is also changed accordingly. In this case, the control unit 2040 may update the first direction 12 based on the result of detection by the sensor 10.

Figure 8:
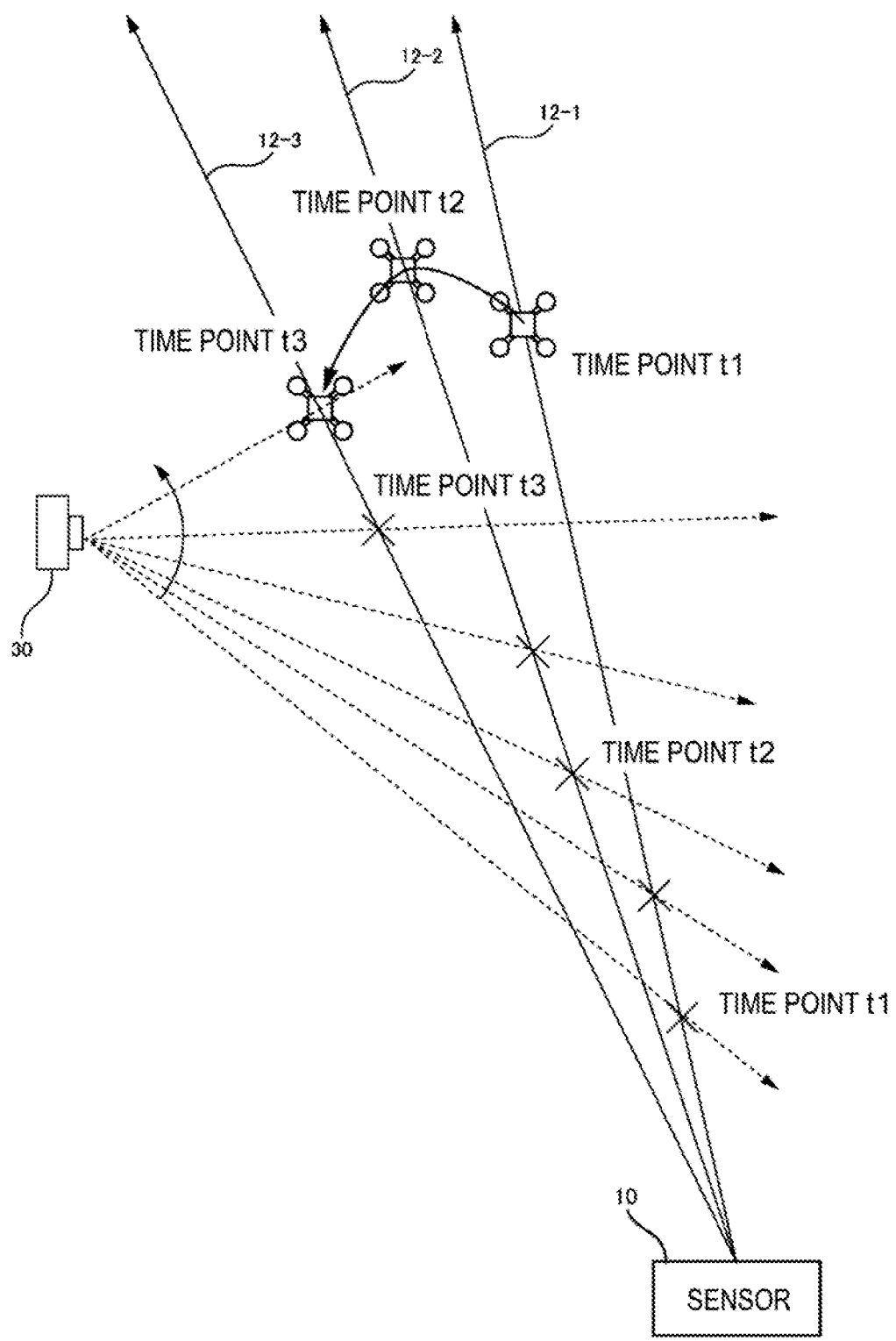
FIG. 8 is a diagram illustrating a scene in which a first direction is updated.

FIG. 8 is a diagram illustrating a case in which the first direction 12 is updated. The first direction 12-1 is a first direction determined by the first detection unit 2020 based on the result of detection by the sensor 10 at a time point t1. The control unit 2040 causes the camera 30 to perform imaging while moving the optical axis direction 34 of the camera 30 along the first direction 12-1 after the time point t1.

Thereafter, the first detection unit 2020 determines a first direction 12-2 based on the result of detection by the sensor 10 at a time point t2. Therefore, the control unit 2040 moves the optical axis direction 34 of the camera 30 along the first direction 12-2 instead of the first direction 12-1 after the time point t2. Thereafter, similarly, a first direction 12-3 at a time point t3 is determined based on the result of detection by the sensor 10 and the optical axis direction 34 of the camera 30 after the time point t3 is moved along the first direction 12-3.

By updating the first direction 12 during the movement of the camera 30 along the first direction 12 as described above, the detection of the moving object 20 using the camera 30 is performed in consideration of the change of the position of the moving object 20 while the optical axis direction 34 of the camera 30 is being moved along the first direction 12. Accordingly, the moving object 20 can be detected more reliably.

Regarding Case where a Plurality of Sensors 10 and Cameras 30 are Used

In the description above, a case where the number of sensors 10 and the number of cameras 30 is one has been described as an example. However, the number of sensors 10 and cameras 30 may be plural. Hereinafter, a case where a plurality of sensors 10 and a plurality of cameras 30 are provided will be specifically described.

Figure 9:
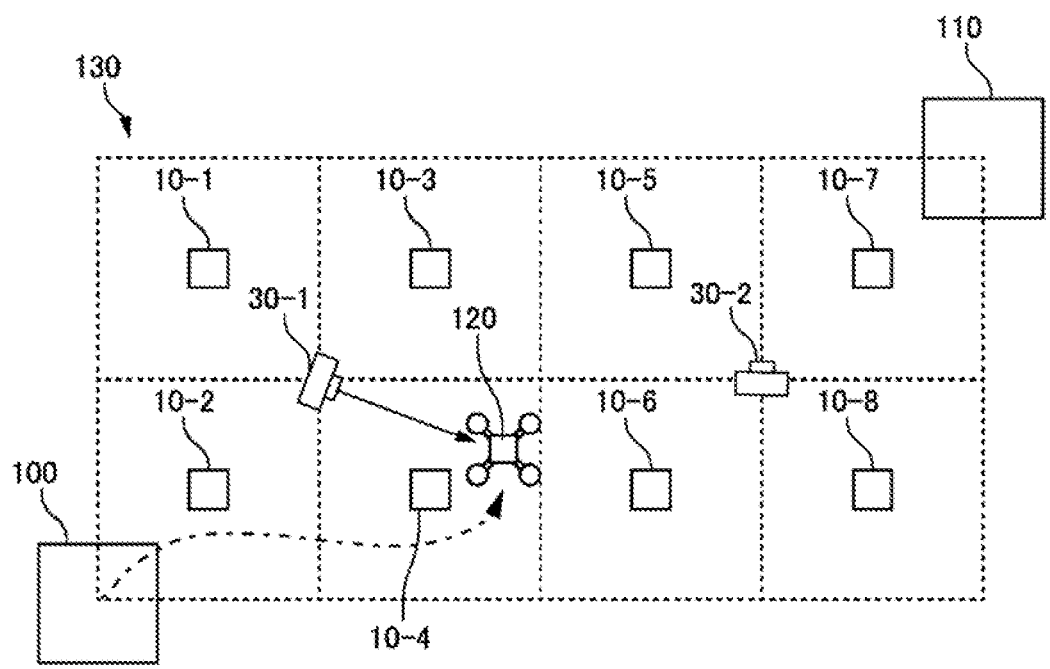
FIG. 9 is a diagram illustrating an area in a plan view in the vertical direction, in which a moving object is monitored.
Figure 10:
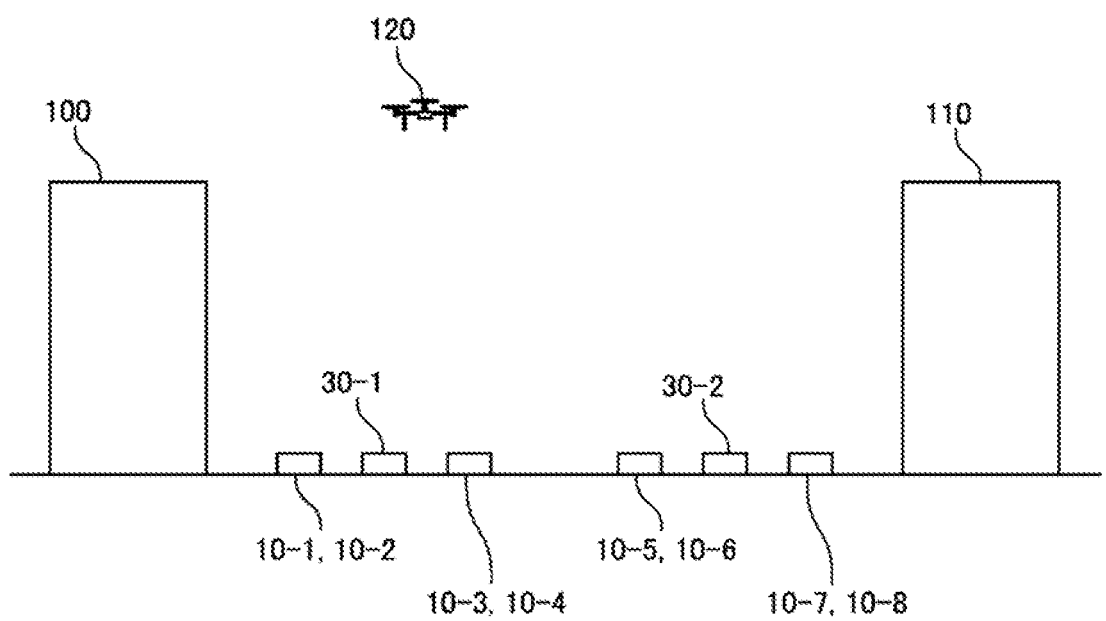
FIG. 10 is a diagram illustrating the area in a side view, in which the moving object is monitored.

FIGS. 9 and 10 are diagrams illustrating a use case in which a plurality of sensors 10 and cameras 30 are provided. FIG. 9 is a plan view of the area in which the moving object 20 is monitored in the vertical direction. FIG. 10 is a diagram of the area in which the moving object 20 is monitored as viewed from the side. The moving object 20 in this use case is a drone 120. The drone 120 flies between a building 100 and a building 110. The flying route is set in the monitoring area 130.

In the monitoring area 130, eight sensors 10 and two cameras 30 are provided. The camera 30-1 is disposed at the center of the sensors 10-1 to 10-4. On the other hand, the camera 30-2 is disposed at the center of the sensors 10-5 to 10-7. A dotted rectangle in the monitoring area 130 indicates a range in which each sensor 10 detects the drone 120.

The first detection unit 2020 detects the drone 120 using the sensors 10-1 to 10-8. Here, if the drone 120 is detected by any one of the sensors 10-1 to 10-4, the control unit 2040 controls the camera 30-1 to generate a captured image 32, and detects the drone 120 from the captured image 32. On the other hand, if the drone 120 is detected by any one of the sensors 10-5 to 10-7, the control unit 2040 controls the camera 30-2 to generate the captured image 32, and detects the drone 120 from the captured image 32.

Example Embodiment 2

Figure 11:
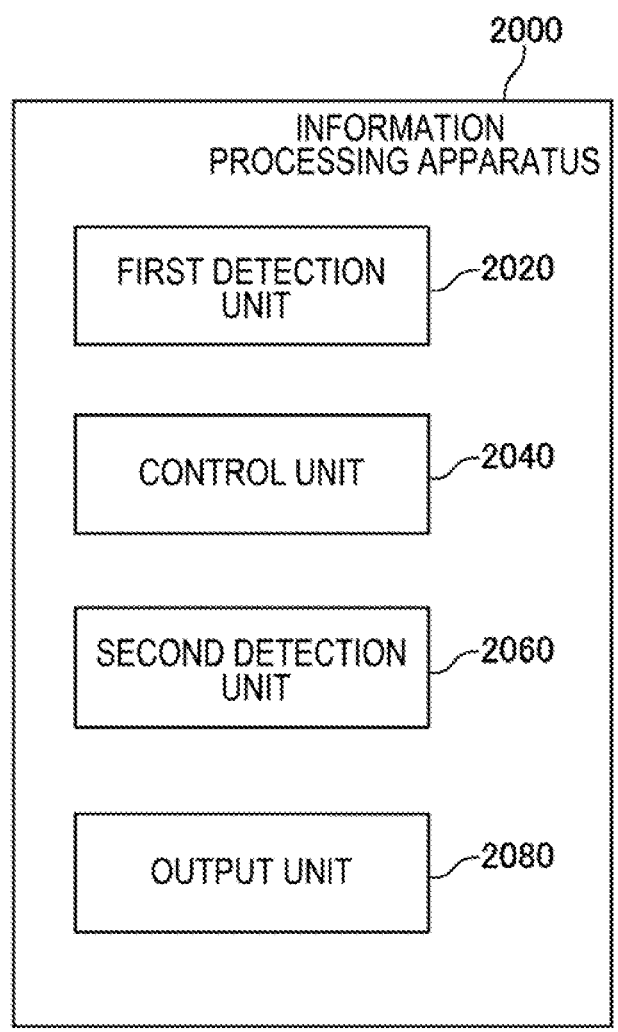
FIG. 11 is a diagram illustrating a functional configuration of an information processing apparatus according to an example embodiment 2.

FIG. 11 is a diagram illustrating a functional configuration of an information processing apparatus 2000 according to an example embodiment 2. The information processing apparatus 2000 according to the example embodiment 2 has the same functions as those of the information processing apparatus 2000 according to the example embodiment 1 except the items described below.

The information processing apparatus 2000 according to the example embodiment 2 includes an output unit 2080. The output unit 2080 outputs the captured image 32 in which the moving object 20 is detected by the second detection unit 2060. There are various methods for outputting the captured image 32. For example, the output unit 2080 outputs the captured image 32 in which the moving object 20 is detected into the storage device to store the captured image 32 in the storage device. In addition, for example, the output unit 2080 outputs the captured image 32 in which the moving object 20 is detected to a display device to display the captured image 32 on the display device. Alternatively, for example, the output unit 2080 may transmit the captured image 32 in which the moving object 20 is detected to a terminal other than the information processing apparatus 2000. For example, the captured image 32 in which the moving object 20 is detected is transmitted to a terminal (hereinafter, a monitor terminal) used by an observer who monitors the moving object. The captured image 32 received by the monitor terminal is displayed on, for example, a display device provided in the monitor terminal.

Here, the information processing apparatus 2000 may have a function of causing the camera 30 to follow the moving object 20 such that the camera 30 continues to image the moving object 20 after the moving object 20 is detected by the second detection unit 2060. In this case, the moving object 20 is included in each captured image 32 generated after the moving object 20 is detected by the second detection unit 2060. That is, video data including the moving object 20 is generated by the camera 30. In this case, the output unit 2080 may output the video data including not only the captured image 32 in which the moving object 20 is detected by the second detection unit 2060 but also captured images 32 generated thereafter. Note that, an existing technology can be used as the technology for causing the camera to follow a specific object.

Example of Hardware Configuration

For example, the hardware configuration of a computer that realizes the information processing apparatus 2000 according to the second example embodiment is illustrated in FIG. 3. However, in the storage device 1080 of the computer 1000 that realizes the information processing apparatus 2000 in the present example embodiment, a program module that realizes the functions of the information processing apparatus 2000 in the present example embodiment is further stored.

Advantageous Effects

According to the information processing apparatus 2000 in the present example embodiment, the captured image 32 in which the moving object 20 is detected is output. Here, since the imaging by the camera 30 may be performed while moving in the optical axis direction 34 along the first direction 12 determined using the sensor 10, the imaging range of the camera 30 can be narrowed to some extent. For example, as described above, a telephoto camera can be used as the camera 30. Therefore, according to the information processing apparatus 2000, the captured image 32 in which the moving object 20 is captured in a large size can be obtained, and thus, it is possible to recognize the appearance of the moving object 20 in detail using the captured image 32.

Example Embodiment 3

Figure 12:
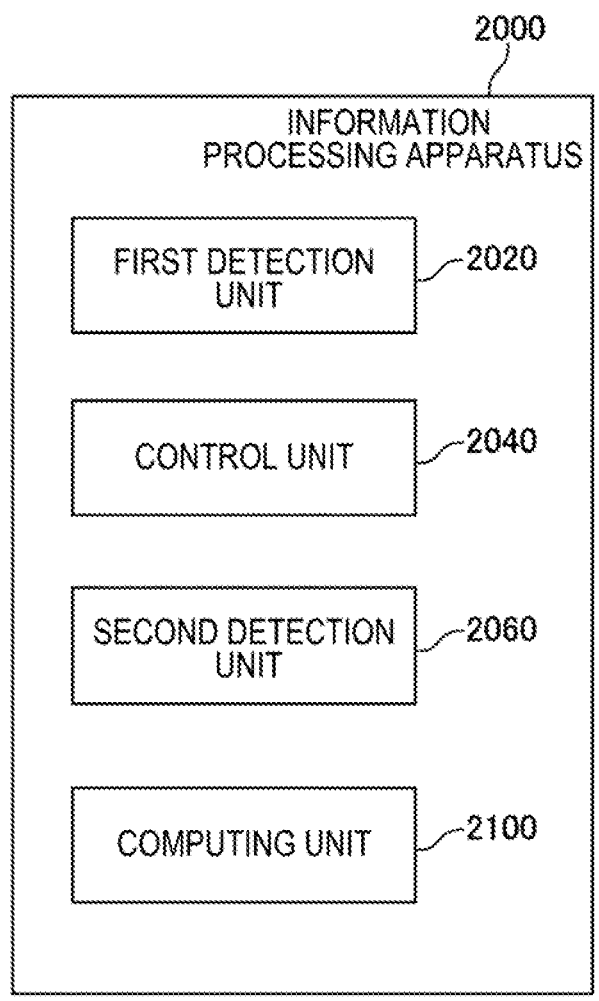
FIG. 12 is a diagram illustrating a functional configuration of an information processing apparatus according to an example embodiment 3.

FIG. 12 is a diagram illustrating a functional configuration of an information processing apparatus 2000 according to an example embodiment 3. The information processing apparatus 2000 according to the example embodiment 3 has the same functions as those of the information processing apparatus 2000 according to the example embodiment 1 or 2 except the items described below.

The information processing apparatus 2000 according to the example embodiment 2 includes a computing unit 2100. The computing unit 2100 has a function of computing a three-dimensional position of the moving object 20 detected by the second detection unit 2060. According to the information processing apparatus 2000, the moving object 20 is detected by each of the sensors 10 and the cameras 30 installed at different positions. Therefore, the three-dimensional position of the moving object 20 is determined as an intersection of the direction from the sensor 10 to the moving object 20 (first direction 12) and the direction from the camera 30 to the moving object 20 (hereinafter, second direction). Therefore, the computing unit 2100 computes an intersection of the first direction 12 and the second direction, and handles the intersection as the three-dimensional position of the moving object 20.

The three-dimensional position can be represented, for example, as a combination of GPS coordinates and altitude. Specifically, the x and y coordinates are the x and y coordinates of the GPS coordinates, respectively, and the z coordinate is the altitude. Alternatively, for example, the three-dimensional position of the moving object 20 may be represented by a relative position based on the positions of the sensor 10 and the camera 30.

Note that, it is preferable to output the three-dimensional coordinates of the moving object 20 computed by the computing unit 2100 using a method similar to the method for the output unit 2080 to detect the captured image 32 in which the moving object 20 is detected. For example, when the captured image 32 is displayed on the display device, it is preferable that the information on the three-dimensional position of the moving object 20 is superimposed and displayed near the moving object 20 on the captured image 32.

Example of Hardware Configuration

The hardware configuration of the computer that realizes the information processing apparatus 2000 according to the example embodiment 3 is represented by, for example, FIG. 3. However, in the storage device 1080 of the computer 1000 that realizes the information processing apparatus 2000 in the present example embodiment, a program module that realizes the functions of the information processing apparatus 2000 in the present example embodiment is further stored.

Advantageous Effects

According to the information processing apparatus 2000 in the present example embodiment, the three-dimensional position of the moving object 20 can be recognized based on the direction from each of the sensor 10 and the camera 30 disposed at the different positions toward the moving object 20. The three-dimensional position computed in this manner can be used for various purposes such as monitoring and tracking of the moving object 20.

As described above, the example embodiment of the present invention is described with reference to the drawings, however, these are just exemplifications of the present invention, and the configuration obtained by combining each of the above-described example embodiment or various configurations other than the above can be adopted.

A part or all of the above-described example embodiments can be described as in the following supplementary notes, but are not limited thereto.

1. An information processing apparatus includes:
a first detection unit that detects a moving object using a sensor and determines a first direction from the sensor toward the moving object;
a control unit that causes a first camera to perform imaging while moving an optical axis direction of the first camera along the first direction; and
a second detection unit that detects the moving object from a first captured image generated by the first camera.

2. In the information processing apparatus according to above 1, the second detection unit handles the moving object detected from the earliest generated first captured image among the first captured images from which the moving object is detected, as the moving object detected by the sensor.

3. In the information processing apparatus according to above 1 or 2,
the sensor is a second camera of which a focal length is shorter than that of the first camera, and
the first detection unit detects the moving object by performing image analysis on a captured image generated by the second camera.

4. In the information processing apparatus according to above 1 or 2, the sensor is an acoustic sensor, and
the first detection unit acquires information representing a feature of a sound emitted by the moving object to be detected, and determines a direction from the acoustic sensor toward a source of the sound as the first direction if the sound having the feature is detected by the acoustic sensor.

5. In the information processing apparatus according to above 1 or 2, the sensor is a radio wave sensor, and
the first detection unit acquires information representing a feature of a radio wave emitted by the moving object to be detected, and determines a direction from the radio wave sensor toward a source of the radio wave as the first direction if the radio wave having the feature is detected by the radio wave sensor.

6. In the information processing apparatus according to one of above 1 to 5, the control unit decides an initial position of an imaging direction of the first camera based on a size of the moving object detected by the sensor, and moves the imaging direction of the first camera from the initial position along the first direction.

7. In the information processing apparatus according to any one of above 1 to 6, the control unit sets a focal length of the first camera such that a focal point of the first camera is positioned on the first direction.

8. In the information processing apparatus according to any one of above 1 to 7,
the first detection unit repeatedly determines the first direction, and
if the first direction is newly determined when the optical axis direction of the first camera is moved along the first direction, the control unit moves the optical axis direction of the first camera along the newly determined first direction.

9. The information processing apparatus according to any one of above 1 to 8 further includes an output unit that outputs the first captured image in which the moving object is detected.

10. The information processing apparatus according to any one of above 1 to 9 further includes a computing unit that computes a three-dimensional position of the moving object based on the first direction and the optical axis direction of the first camera when the moving object is detected.

11. A control method executed by a computer includes:
detecting for detecting a moving object using a sensor and determining a first direction from the sensor toward the moving object;
causing a first camera to perform imaging while moving the optical axis direction of the first camera along the first direction; and
detecting the moving object from a first captured image generated by the first camera.

12. The control method according to above 11, in the step of detecting the moving object from the first captured image, the moving object detected from the earliest generated first captured image among the first captured images from which the moving object is detected, is handles as the moving object detected by the sensor.

13. The control method according to claim 11 or 12, the sensor is a second camera of which a focal length is shorter than that of the first camera, and
in the step of detecting the moving object using the sensor, the moving object is detected by performing image analysis on a captured image generated by the second camera.

14. The control method according to above 11 or 12, the sensor is an acoustic sensor, and
in the step of detecting the moving object using the sensor, information representing a feature of a sound emitted by the moving object to be detected is acquired, and a direction from the acoustic sensor toward a source of the sound is determined as the first direction if the sound having the feature is detected by the acoustic sensor.

15. The control method according to above 11 or 12, the sensor is a radio wave sensor, and
in the first detecting, information representing a feature of a radio wave emitted by the moving object to be detected is acquired, and determines a direction from the radio wave sensor toward a source of the radio wave as the first direction if the radio wave having the feature detected by the radio wave sensor.

16. The control method according to any one of above 11 to 15, in the step of causing the first camera to perform imaging, an initial position of the imaging direction of the first camera is decided based on a size of the moving object detected by the sensor, and the imaging direction of the first camera is moved from the initial position along the first direction.

17. The control method according to any one of above 11 to 16, in the step of causing the first camera to perform imaging, a focal length of the first camera is set such that a focal point of the first camera is positioned on the first direction.

18. The control method according to any one of above 11 to 17,
in the step of detecting the moving object using the sensor, the first direction is repeatedly determined, and
in the step of causing the first camera to perform imaging, if the first direction is newly determined when the optical axis direction of the first camera is moved along the first direction, the optical axis direction of the first camera is moved along the newly determined first direction.

19. The control method according to any one of above 11 to 18 further includes outputting the first captured image in which the moving object is detected.

20. The control method according to any one of above 11 to 19 further includes computing a three-dimensional position of the moving object based on the first direction and the optical axis direction of the first camera when the moving object is detected.

21. A program that causes a computer to execute each step in the control method according to any one of above 11 to 20.

The invention claimed is:
1. An information processing apparatus comprising:
a memory storing instructions; and
at least one hardware processor configured to execute the instructions to implement:
    detecting a moving object using a sensor and determining a first direction from the sensor toward the moving object;
    controlling a first camera to perform imaging while moving an optical axis direction of the first camera along the first direction; and
    detecting the moving object from a first captured image generated by the first camera,
wherein the sensor is an acoustic sensor or a radio wave sensor, and
wherein the at least one hardware processor is further configured to execute the instructions to implement:
    acquiring information representing a feature of a sound or a radio wave emitted by the moving object to be detected, and
    determining a direction from the sensor toward a source of the sound or the radio wave as the first direction, if the sound or the radio wave having the feature is detected by the sensor.

2. The information processing apparatus according to claim 1,
wherein the at least one hardware processor is further configured to execute the instructions to implement handling the moving object detected from the earliest generated first captured image among the first captured images from which the moving object is detected, as the moving object detected by the sensor.

3. The information processing apparatus according to claim 1,
wherein the at least one hardware processor is further configured to execute the instructions to implement deciding an initial position of an imaging direction of the first camera based on a size of the moving object detected by the sensor, and moving the imaging direction of the first camera from the initial position along the first direction.

4. The information processing apparatus according to claim 1,
wherein the at least one hardware processor is further configured to execute the instructions to implement setting a focal length of the first camera, thereby positioning a focal point of the first camera on the first direction.

5. The information processing apparatus according to claim 1,
wherein the at least one hardware processor is further configured to execute the instructions to implement repeatedly determining the first direction, and
wherein, if the first direction is newly determined when the optical axis direction of the first camera is moved along the first direction, the at least one hardware processor is further configured to execute the instructions to implement moving the optical axis direction of the first camera along the newly determined first direction.

6. The information processing apparatus according to claim 1, wherein the at least one hardware processor is further configured to execute the instructions to implement outputting the first captured image in which the moving object is detected.

7. The information processing apparatus according to claim 1, at least one hardware processor is further configured to execute the instructions to implement computing a three-dimensional position of the moving object based on the first direction and the optical axis direction of the first camera when the moving object is detected.

8. A control method executed by a computer, comprising:
   detecting a moving object using a sensor and determining a first direction from the sensor toward the moving object;
   causing a first camera to perform imaging while moving the optical axis direction of the first camera along the first direction; and
   detecting the moving object from a first captured image generated by the first camera,
   wherein the sensor is an acoustic sensor or a radio wave sensor, and
   wherein the control method further comprises:
      acquiring information representing a feature of a sound or a radio wave emitted by the moving object to be detected, and
      determining a direction from the sensor toward a source of the sound or the radio wave as the first direction, if the sound or the radio wave having the feature is detected by the sensor.

9. A non-transitory computer-readable storage medium storing a program that causes a computer to execute the control method according to claim 8.

* * * * *